3,427,347
CHLOROACETOXYLATION OF OLEFINS
Seymour J. Lapporte, Orinda, Calif., assignor to Chevron Research Company, San Francisco, Calif., a corporation of Delaware
No Drawing. Filed Dec. 17, 1965, Ser. No. 514,704
U.S. Cl. 260—491  4 Claims
Int. Cl. C07c 67/00, 17/02

ABSTRACT OF THE DISCLOSURE

The chloroacetoxylation of 1-olefins with chlorine and a tertiary alkyl acetate provides a less corrosive reaction medium and a reaction product containing a high ratio of chlorohydrin acetate and diacetate to dichloride which reaction product can be readily hydrolyzed to glycol.

---

The present invention relates to the preparation of 1,2-glycols. More particularly, the invention has to do with a process of preparing 1,2-glycols by the chloroacetoxylation reaction of 1-olefins having 5 to 20 carbon atoms, followed by hydrolysis.

It is known to produce 1,2-glycols by chlorinating $C_5$–$C_{20}$ 1-olefins in the presence of an acetate ion-donating medium to produce a chloroacetoxylated reaction product mixture, which upon hydrolysis yields the desired 1,2-glycols. For example, in U.S. Patent No. 2,971,989 it is taught to chlorinate $C_5$–$C_{20}$ α-olefins at a suitable temperature, for example, 10° C. to 30° C., with chlorine in stoichiometric amounts in the presence of acetic acid which may be aqueous and an acetate salt, such as sodium acetate. The suggested amount of acetic acid is 10 to 100 mols per mol of olefin; and the sodium acetate 1 to 7 mols per mol of olefin. The resulting chloroacetoxylated reaction product mixture, including the dichloride, chlorohydrin acetate or the hydroxyacetate and the diacetate derivatives of the olefin, are subjected to hydrolysis at elevated temperatures and pressures in the presence of an organic solvent to produce the 1,2-glycols.

A disadvantage when proceeding in accordance with the above patent is that the acetate ion-donating medium is corrosive, thus requiring special corrosion-resistant equipment.

Another disadvantage is the difficulty of providing a homogeneous reaction mixture since the solubility of olefin, depending on molecular weight, in the acetic acid-acetate salt medium, and the solubility of the metal acetate salt in the olefin-acetic acid mixture, are limited.

I have unexpectedly found that the above disadvantage can be overcome if in place of the acetic acid and sodium acetate there is used an ester of acetic acid, such as tertiarybutyl acetate. Tertiary alkyl esters of acetic acid in which the reactants and reaction products are soluble and which provide a homogeneous, non-corrosive reaction system are those containing 4 to 10 carbon atoms in the tertiary alkyl group. Accordingly, the ester contemplated herein is one derived from acetic acid and a tertiary alcohol of 4 to 10 carbon atoms, such as tertiary butyl acetate, tertiary amyl acetate, tertiary octyl acetate, and tertiary decyl acetate. These tertiary alkyl acetates can also be prepared from acetic acid and appropriate alkene.

More specifically, the invention is carried out under chloroacetoxylation conditions such as to minimize dichloride formation, i.e., to provide a high ratio of combined chlorohydrin acetate and diacetate to a difficultly hydrolyzable dichloride. Accordingly, there are used stoichiometric proportions of chlorine and $C_5$–$C_{20}$ olefin at temperatures of the order of 10° C. to 50° C., temperatures of 25° C. to 30° C. being preferred. The amount of tertiary alkyl acetate used is sufficient to dissolve the reactants and reaction product mixture, and thus provide a homogeneous system. Specifically, at least 1 mol, preferably 5 mols, of the acetate for each mol of olefin will be found satisfactory. The upper limit of the amount of acetate is governed by practical considerations, 50 mols, preferably 20 mols of the acetate for each mol of the olefin being cited as illustrative.

Following reaction and removal of excess solvent and low boiling by-products, the product mixture can then be hydrolyzed. One method of hydrolysis is to subject the chloroacetoxylated reaction product mixture to temperatures of 200 to 250° C. in the presence of a base such as sodium acetate to neutralize the chlorine in the mixture and of a cosolvent, such as acetone, dioxane, methylethylketone or tetrahydrofuran, the cosolvent containing 10–50 volume percent water. Another method is to effect admixture of the chloroacetoxylated product with a suitable alcohol, e.g., ethylene glycol, and heating the mixture up to the refluxing temperature of the alcohol, again in the presence of a base, as shown in application Ser. No. 514,661, filed Dec. 17, 1965.

The following examples illustrate the practice of the invention.

EXAMPLE 1

Chlorine and nitrogen were each passed at a rate of 200 ml. per minute into a rapidly stirred solution of 33.7 g. (0.20 mol) 1-dodecene and 226 g. tertiary-butyl acetate (1.95 mol), the solution being maintained at 20–26° C., over a period of 30 minutes. The reaction product mixture was distilled in a 12-inch helices-packed column. Vapor-phase chromatography of the distillate indicated the presence of approximately 16 g. (93% based on converted olefin) of t-butyl chloride. By vapor phase chromatography it was determined that 93 mol percent of the olefin had been converted, and that the product contained 43% chlorohydrin acetate derivative of the olefin, 38% dichloride derivative of the olefin, and 1% of the diacetate derivative. The weight ratio of the sum of chlorohydrin acetate and diacetate to dichloro was 1.1/1.0.

26.3 g. of the chloroacetoxylated product mixture was added over one hour to a refluxing solution of 24.6 g. of sodium acetate in 93 g. ethylene glycol. The reaction was continued for 2 hours after addition of the chloroacetoxylated product, during which time the temperature decreased from 201° C. to 181° C. The hydrolysis reaction mixture was cooled, and then filtered to remove sodium chloride. The filtrate was extracted three times with 100 ml. portions of pentane, and twice with 100 ml. portions of diethyl ether. The extracts were combined and dried over sodium sulfate. The solvents were then removed on a rotary evaporator and the residue distilled. 9.43 g. of dodecanediol were recovered. This corresponds to a 61% yield based on an original conversion of olefin of 93%.

EXAMPLE 2

0.2 mol 1-dodecene was dissolved in 176.2 g. (2.0 mols) of ethyl acetate and chlorinated at 23–26° C. by passing thereinto a mixture of chlorine and nitrogen at rates, respectively, of 200 and 235 ml./min. After thirty minutes chlorination was terminated. Distillation of t-butyl chloride and excess ethyl acetate solvent gave a residue which after washing with saturated $NaHCO_3$ solution weighed 57.2 g. Vapor phase chromatography indicated that 93% of the dodecene had been converted to products of which 63.4% was dodecane dichloride and only 16% and 2.7% were chlorohydrin acetate and diacetate, respectively. The weight ratio of chlorohydrin acetate plus diacetate to dichloride was thus only 0.29/1.

This example illustrates that in order to produce satisfactory results the nature of the alkyl group of the acetate ester is critical.

In addition to providing a homogeneous, less corrosive reaction system, the present invention also provides a simpler process in that no metal salts are present during the chloroacetoxylation reaction, and as a result no metal chloride precipitate, requiring its removal, is formed.

I claim:

1. In the chloroacetoxylation reaction involving the addition of a stoichiometric amount of chlorine to 1-olefin of 5 to 20 carbon atoms at 10–50° C. in the presence of acetate donating medium, whereby a crude reaction product mixture, including the dichloride, the chlorohydrin acetate and the diacetate of the olefin is obtained, the improvement which comprises carrying out the chloroacetoxylation reaction in the presence of an acetate donating medium consisting essentially of a tertiary alkyl acetate having 4 to 10 carbon atoms in the alkyl group, the tertiary alkyl acetate being employed in sufficient amount to dissolve the reactants and the reaction product mixture.

2. Process according to claim 1, wherein the tertiary alkyl acetate is used in proportions of 1 to 50 mols for each mol of olefin used.

3. Process according to claim 2, wherein the tertiary alkyl acetate is used in proportions of 5 to 20 mols for each mol of olefin used.

4. Process according to claim 3, wherein the tertiary alkyl acetate is tertiary butyl acetate.

References Cited

UNITED STATES PATENTS

| 1,402,317 | 1/1922 | Rodebush | 260—636 |
| 2,971,989 | 2/1961 | Lapporte et al. | 260—636 |

LEON ZITVER, *Primary Examiner.*

J. E. EVANS, *Assistant Examiner.*

U.S. Cl. X.R.

260—660, 635, 636, 652